(12) United States Patent
Yang (10) Patent No.: US 10,615,391 B2
(45) Date of Patent: Apr. 7, 2020

(54) LITHIUM METAL ELECTRODE AND ITS RELATED LITHIUM METAL BATTERY

(71) Applicants: Prologium Technology Co., Ltd., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 290 days.

(21) Appl. No.: 15/728,673

(22) Filed: Oct. 10, 2017

(65) Prior Publication Data

US 2018/0102523 A1 Apr. 12, 2018

Related U.S. Application Data (60) Provisional application No. 62/407,004, filed on Oct. 12, 2016.

(51) Int. Cl.
| | |
|---|---|
| *H01M 2/16* | (2006.01) |
| *H01M 4/70* | (2006.01) |
| *H01M 10/052* | (2010.01) |
| *H01M 2/18* | (2006.01) |
| *H01M 4/134* | (2010.01) |
| *H01M 4/38* | (2006.01) |
| *H01M 10/0525* | (2010.01) |
| *H01M 4/02* | (2006.01) |

(52) U.S. Cl.
CPC .......... *H01M 2/168* (2013.01); *H01M 2/1686* (2013.01); *H01M 2/18* (2013.01); *H01M 4/134* (2013.01); *H01M 4/382* (2013.01); *H01M 4/70* (2013.01); *H01M 10/052* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2016/0111701 | A1* | 4/2016 | Schumann | H01M 2/166 429/144 |
| 2016/0293943 | A1* | 10/2016 | Hu | H01M 4/134 |

* cited by examiner

*Primary Examiner* — Wyatt P McConnell
(74) *Attorney, Agent, or Firm* — Rabin & Berdo, P.C.

(57) ABSTRACT

A lithium metal electrode and its related lithium metal battery is disclosed in the present invention. The lithium metal electrode comprises a current collector, a lithium metal layer, an insulation frame, a porous electrical insulation layer and an ionic diffusion layer. The current collector has at least a well. The lithium metal layer is disposed on the bottom surface of the well. The insulation frame is disposed along the opening of the well. The insulation frame extends radially outward the opening to cover a top surface of the current collector partially and extends vertically toward the inner sidewall of the well. The lithium dendrites will mostly plate in the well and will not plate upwards due to the inhibition layer. Hence, the lithium dendrites will not penetrate through the electrical insulator so that the safety of the lithium metal battery can be improved greatly.

29 Claims, 4 Drawing Sheets

LITHIUM METAL ELECTRODE AND ITS RELATED LITHIUM METAL BATTERY

This Non-provisional application claims priority under 35 U.S.C. § 119(a) on Patent Application No. 62/407,004 filed in United States on Oct. 12, 2016, the entire contents of which are hereby incorporated by reference.

BACKGROUND

1. Technical Field

The present invention is related to an electrode, in particular to a lithium metal electrode and its related lithium metal battery.

2. Description of Related Art

Comparing to the current non-lithium battery system, the lithium battery system has advantages of high operation voltage (up to 3.6V), high energy density (up to 120 Wh/kg), light weight, longer cycle life, friendly to the environment and so on. According to the researching history of the lithium battery system, the earliest lithium battery developed is the rechargeable lithium metal battery which has pretty high energy density but meanwhile has serious issues of stability and safety because of the high chemical reacting ability to the electrolyte. Considering the safety issue of the lithium metal battery system, the developments of the rechargeable lithium battery gradually focus on the rechargeable lithium-alloy battery system and the rechargeable lithium-ion battery system.

As for the performances of the battery system, except for the safety requirement, it is crucial to ensure that the capacity of the battery system is enough for supporting the operation duration of the device. Consequently, the capacity of the battery system becomes the important developing issue again. In the past, the development of the lithium metal battery system was suspended due to its safety issue. Comparing to the lithium-ion and the lithium polymer systems, the energy density of the lithium metal system is much higher than other systems. However, because the lithium metal has high chemical activity, an extreme oxidation-reduction reaction occurs if the lithium metal is not stored or operated under the proper condition. Practically, the lithium metal battery system is quite suitable for the current smart electrical device only if the issues of safety, processing and storage of the lithium metal can be conquered.

However, the electrolyte of the lithium-ion battery system is the liquid comprising organic solvents so that the evaporation, ignition problems occur inevitably. Besides, the electrolyte leaks due to the poor sealing of the battery and this causes the safety issue. Recently, in order to ensure the safety, the rechargeable lithium polymer battery system is developed. The original organic solvents are replaced by the polymer electrolyte to improve the safety of the lithium battery system.

Accordingly, a lithium metal electrode is provided to overcome the above problems.

SUMMARY OF THE INVENTION

It is an objective of this invention to provide a lithium metal electrode and its related lithium metal battery. The insulation layer of the porous electrical insulation layer of the lithium metal electrode can provide a specific region for lithium dendrite plating.

It is an objective of this invention to provide a lithium metal electrode and its related lithium metal battery. The porous electrical insulation layer efficiently inhibits the height of plating of the lithium dendrite during charging due to the structural strength of the inhibition layer. The lithium dendrite will mainly plate horizontally so that the specific regions formed via the porous electrical insulation layer are highly efficiently used for lithium dendrite plating. Hence, the lithium dendrite will not penetrate through the electrical insulator to avoid inner shorting of the battery. Meanwhile, the lithium dendrite plate toward the radiation direction instead of toward the vertical direction so that the thickness of the battery will not verify extremely.

It is an objective of this invention to provide a lithium metal electrode and its related lithium metal battery. The ionic diffusion layer disposed inside the well is porous and is made of particles and/or fibers. The lithium dendrite plates and strips inside the pores of the ionic diffusion layer. During plating, the lithium dendrite attaches to the particles and/or the fibers of the ionic diffusion layer to enhance the strength of the solid electrolyte interface (SEI). Comparing to the SEI's thickness (around 10~50 nanometers), the volume change (15~20 microns) of plating/stripping of the lithium dendrite is too violent and the SEI will be seriously damaged during plating and/or stripping of the lithium dendrite without providing the supporting from the ionic diffusion layer. The ionic diffusion layer having particles and/or the fibers can provide supporting for the SEI to decrease the capacity loss of the battery and even, under certain conditions, can react with the reaction of forming the SEI.

It is an objective of this invention to provide a lithium metal electrode and its related lithium metal battery. The surfaces and/or the pores created via the particles and/or fibers of the ionic diffusion layer can serve as the diversions for the liquid and/or gel electrolyte so that the plating/stripping of the lithium dendrite can be more efficient for continuous interface of the electrolyte. Also, the interface between the lithium dendrite and the electrolyte can be kept complete so that the resistance of the interface can be reduced and the uniformity of the lithium dendrite plating can be revealed via controlling the over-voltage of the interface.

The present invention disclosed a lithium metal electrode which comprises a current collector, at least a lithium metal layer, at least an insulation frame, a porous electrical insulation layer and an ionic diffusion layer. The current collector has at least a well having an inner sidewall and a bottom surface, where the lithium metal layer is disposed on. The insulation frame is disposed alone a periphery of the opening of the well. The insulation frame extends radially outward the opening to cover a top surface of the current collector partially and extends vertically toward the inner sidewall of the well. The insulation frame contacts with a top surface of the lithium metal layer so that the inner sidewall of the well is completely covered for electrically insulated. The porous electrical insulation layer covers the opening of the well and has a plurality of through holes. The porous ionic diffusion layer is disposed inside the well and is under the porous electrical insulation layer and the through holes completely. The diameter of the through hole is smaller than diameter of the well.

The present invention discloses a lithium metal battery which comprises a lithium metal electrode, a cathode electrode, an electrical insulator and a sealing frame, wherein the lithium metal electrode comprises a current collector, at least a lithium metal layer, at least an insulation frame, a porous electrical insulation layer and an ionic diffusion layer. The current collector has at least a well having an inner sidewall and a bottom surface, where the lithium metal layer is disposed on. The insulation frame is disposed alone a periphery of the opening of the well. The insulation frame extends radially outward the opening to cover a top surface of the current collector partially and extends vertically toward the inner sidewall of the well. The insulation frame contacts with a top surface of the lithium metal layer so that the inner sidewall of the well is completely covered for electrically insulated. The porous electrical insulation layer covers the opening of the well and has a plurality of through holes. The porous ionic diffusion layer is disposed inside the well and is under the porous electrical insulation layer and the through holes completely. The diameter of the through hole is smaller than diameter of the well. The sealing frame is disposed on an inner periphery alone both of the first current collector of the lithium metal electrode and the second current collector of the cathode electrode for sealing.

The present invention discloses a lithium metal battery which comprises a lithium metal electrode, a cathode electrode, an electrical insulator and a sealing frame, wherein the lithium metal electrode comprises a current collector, at least a lithium metal layer, at least an insulation frame, a porous electrical insulation layer and an ionic diffusion layer. The current collector has at least a well having an inner sidewall and a bottom surface, where the lithium metal layer is disposed on. The insulation frame is disposed alone a periphery of the opening of the well. The insulation frame extends radially outward the opening to cover a top surface of the current collector partially and extends vertically toward the inner sidewall of the well. The insulation frame contacts with a top surface of the lithium metal layer so that the inner sidewall of the well is completely covered for electrically insulated. The porous electrical insulation layer covers the opening of the well and has a plurality of through holes. The porous ionic diffusion layer is disposed inside the well and is under the porous electrical insulation layer and the through holes completely. The diameter of the through hole is smaller than diameter of the well. The sealing frame is disposed corresponding to the insulation frame so that the battery can be sealed via both the sealing frame and the insulation frame.

According to the lithium metal electrode and its related lithium metal battery, the lithium dendrite will only plate within the specific region defined via the well of the current collector, the insulation frame, the porous insulation layer as well as the ionic diffusion layer. Hence, the lithium dendrite will not penetrate through the electrical insulator of the battery. The inner shorting of the battery will not occur and the safety of the battery can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

DETAILED DESCRIPTION

Figure 1:
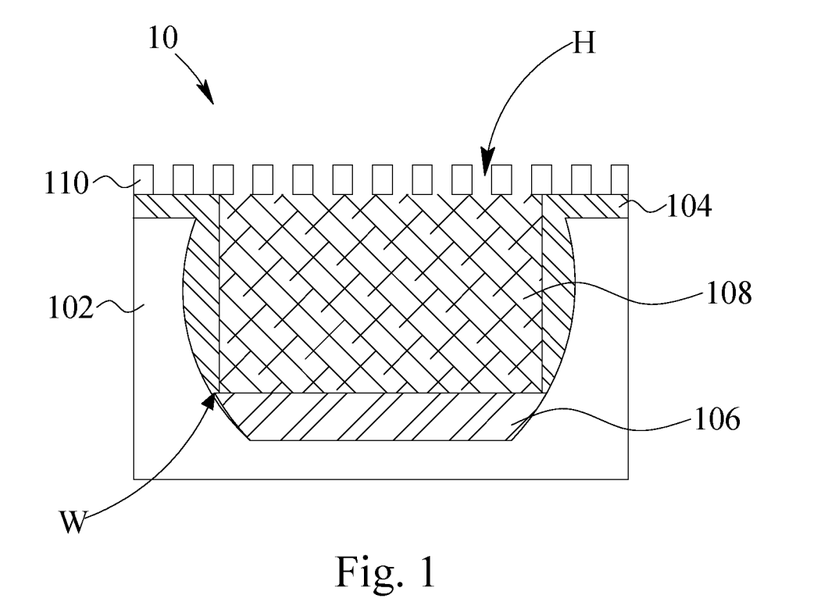
FIG. 1 illustrates a cross-section diagram of the lithium metal electrode of the present invention.

As illustrated in FIG. 1, the lithium metal electrode 10 comprises a current collector 102, at least a lithium metal layer 106, at least an insulation frame 104, a porous electrical insulation layer 110 and an ionic diffusion layer 108. The current collector 102 has at least a well W having an inner sidewall and a bottom surface, where the lithium metal layer 106 is disposed on. The porous electrical insulation layer 110 covers the opening of the well W and has a plurality of through holes H. The porous ionic diffusion layer 108 is disposed inside the well W and is under the porous electrical insulation layer 110 and the through holes H completely. The diameter of the through hole H is smaller than diameter of the well W.

Due to the thickness of the lithium metal layer 106, besides the bottom surface of the well W is covered via the lithium metal layer 106, some parts of the inner sidewall of the well W are also covered via the lithium metal layer 106. The rest of the inner sidewall of the well W is covered via the insulation frame 104. The insulation frame 104 contacts with the top surface of the well W directly. Accordingly, the entire inner sidewall and the bottom surface of the well W are all covered. Since no any part of the surface of the well W is exposed, as the lithium ions plates and/or strips, most of the lithium dendrites can be formed on the surface of the lithium metal layer 106; rest of the lithium dendrites would be formed nearby the lithium metal layer 106. If any part of the surface of the well W is exposed, the lithium dendrites will directly form on the exposed surface of the well W of the current collector 102, which has a reaction voltage closer to the lithium's reaction voltage, and more lithium ions would be exhausted after cycling. The ionic diffusion layer 108 is disposed inside the well W of the current collector 102 and is adjacent to the lithium metal layer 106. The ionic diffusion layer 108 may directly or indirectly contact with the lithium metal layer 106 or, under certain conditions, the ionic diffusion layer 108 even dose not contact with the lithium metal layer 106 at all. The ionic diffusion layer 108 is disposed inside the well W completely. The ionic diffusion layer 108 is positioned entirely within the well W and dose not penetrate into the porous electrical insulation layer 110. That is, the ionic diffusion layer 108 dose not position into the through holes H of the porous electrical insulation layer 110.

Figure 2:
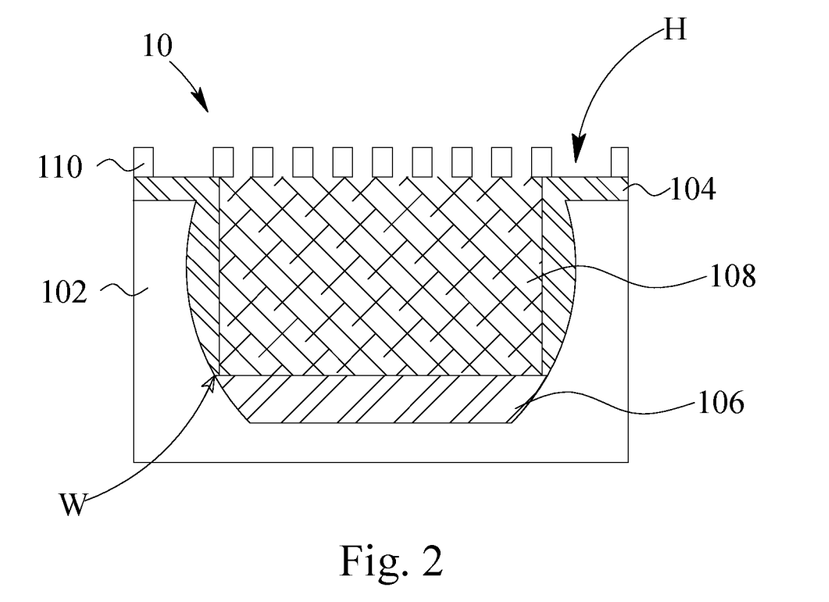
FIG. 2 illustrates a cross-section diagram of the lithium metal electrode of the present invention.

As illustrated in FIG. 1, the through holes H of the porous electrical insulation layer 110 are uniformed, that is, the diameters of all through holes H of the porous electrical insulation layer 110 are the same. In contrast, As illustrated in FIG. 2, the through holes H of the porous electrical insulation layer 110 are not uniformed, that is, the diameters of through holes H of the porous electrical insulation layer 110 are not the same. As for the well W of the current collector 102, the current collector 102 may have more than one well W. The wells W of the current collector 102 are uniformed or not uniformed. Practically, the porous electrical insulation layer 110 having the uniformed through holes H can be matched with the current collector 102 having only one well W, with the current collector 102 having the uniformed-sized wells W or with the current collector 102 having ununiformed-sized wells W. In contrast, the porous electrical insulation layer 110 having the ununiformed through holes H can be matched with all the types of the current collector 102 mentioned above depending on different requirements of cell design. No matter what kind of combinations mentioned above, the diameters of the through holes H must be smaller than the diameters of the wells W. More precisely, the diameters of the through holes H are not larger than 1 micron; the diameters of the wells W are not less than 50 microns. The diameter of the well W is mainly depended on the active area of the battery. Additionally, the depth of the well W is ranging from 15~40 microns.

The aperture of the porous electrical insulation layer 110 is ranging from 25~80%. The aperture of the current collector 102 is ranging from 40~99.5%, wherein the higher aperture can be revealed in the case of the lithium metal electrode (not shown) having narrow border. The thickness of the porous electrical insulation layer 110 is ranging from 1~23 microns; the thickness of the current collector 102 is ranging from 16~50 microns. According to the thickness of the current collector 102 and the depth of the well W, the thickness of the current collector 102 excluding the well W is ranging from 1~10 microns.

The material of the current collector 102 can be metal or any other conductive materials, such as copper, nickel, steel or any combinations thereof. Based on the requirement of capacity and design, the thickness of the lithium metal layer 106 is ranging from 0.3~5 microns. The outer surface of the porous electrical insulation layer 110 is made of the non-conductive material. As the porous electrical insulation layer 110 is a single-layer structure, the material of the porous electrical insulation layer 110 is insulated, such as insulation polymer material, insulation ceramic material, insulation glass material, insulation glass fiber material and any combinations thereof. The insulation polymer material includes polyimide, polyethylene terephthalate, polyurethane, polyacrylate, epoxy or silicone. The insulation glass fiber material includes FR4-class epoxy glass fiber material. As the porous electrical insulation layer 110 is a multi-layer structure, besides the material mentioned above, the porous electrical insulation layer 110 is made of the electrical insulated material, any material having electrical insulated coating or any material completely covered via electrical insulated material. Additionally, the ionic diffusion layer 108 is porous and can be made of the polymer material, ceramic material, glass material, fiber material and any combinations thereof. The pores of the ionic diffusion layer 108 may be made via the particle stacking and/or fiber crossing. The particles include ceramic particles, polymer particles and/or glass particles. The fibers include polymer fibers and/or glass fibers. The surface of the ionic diffusion layer 108 may further be treated to create a charged surface carrying anions and/or cations. For instance, the charged surface with cations of the ionic diffusion layer 108 can reduce the electric double layer effect so that the polarization of lithium ion migration during charging. The charged surface with anions of the ionic diffusion layer 108 can be helpful for the distribution of the lithium ions.

Figure 3:
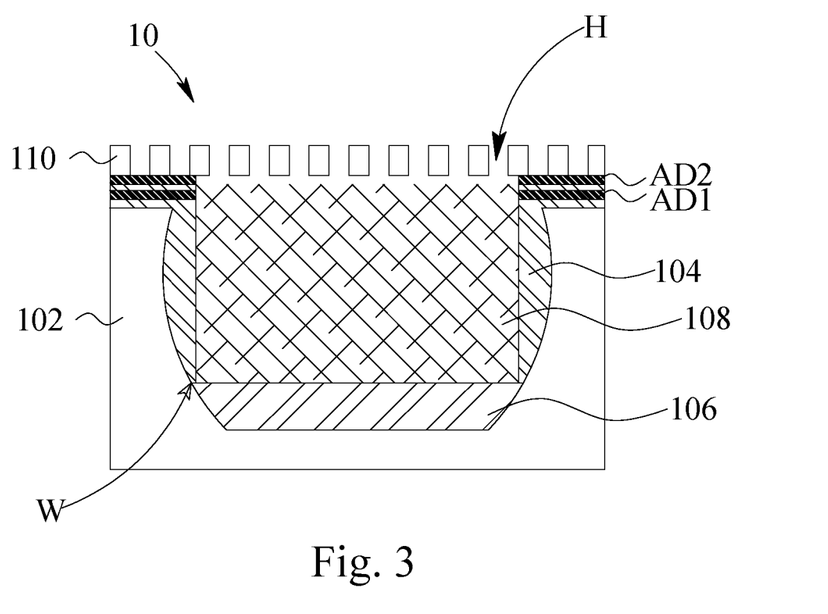
FIG. 3 illustrates a cross-section diagram of the lithium metal electrode of the present invention.

In FIG. 3, the insulation frame 104 is shown as a multi-layer structure. The insulation frame 104 has a first adhesion layer AD1 for adhering. The material of the first adhesion layer AD1 is selected from the group consisting of thermal-setting polymer, thermal-plastic polymer and any combinations thereof, wherein the thermal-setting polymer is selected from the group consisting of silicone, epoxy, acrylic acid resin and any combinations thereof and the thermal-plastic polymer is selected from the group consisting of polyethylene, polypropylene, thermal-plastic polyimide, thermal-plastic polyurethane and any combinations thereof. The material of the first adhesion layer AD1 would be better selected from the electrolyte-inert material, such as silicone, polyethylene, polypropylene, thermal-plastic polyimide and so on. Hence, the first adhesion layer AD1 would not react with the electrolyte, especially the liquid-phase electrolyte and/or the gel-phase electrolyte, so that the adhesion ability of the first adhesion layer AD1 would not be reduced. Besides, a second adhesion layer AD2 is exerted to adhere the insulation frame 104 (and/or the current collector 102, not shown) and the porous electrical insulation layer 110. The material of the second adhesion layer AD2 may or may not be selected from the material mentioned for the first adhesion layer AD1. Similarly, the material of the second adhesion layer AD2 would be better to choose the material that does not react with the electrolyte, especially the liquid-phase electrolyte and/or the gel-phase electrolyte, so that the second adhesion layer AD2 would not be dissolved, swelled and/or deteriorated. In order to make the electrode thinner, the thickness of the first adhesion layer AD1 would be better ranging from 1~30 microns; the thickness of the second adhesion layer AD2 would be better ranging from 1~30 microns as well. Accordingly, the migration distance of the lithium ion inside the lithium metal electrodes 10 would not be increased so that the capacity of the battery would not be decreased. Although the first adhesion layer AD1 and the second adhesion layer AD2 are both illustrated in FIG. 3, in practical, the exertion of the first adhesion layer AD1 and the second adhesion layer AD2 can be selected depending on different requirements.

Figure 4:
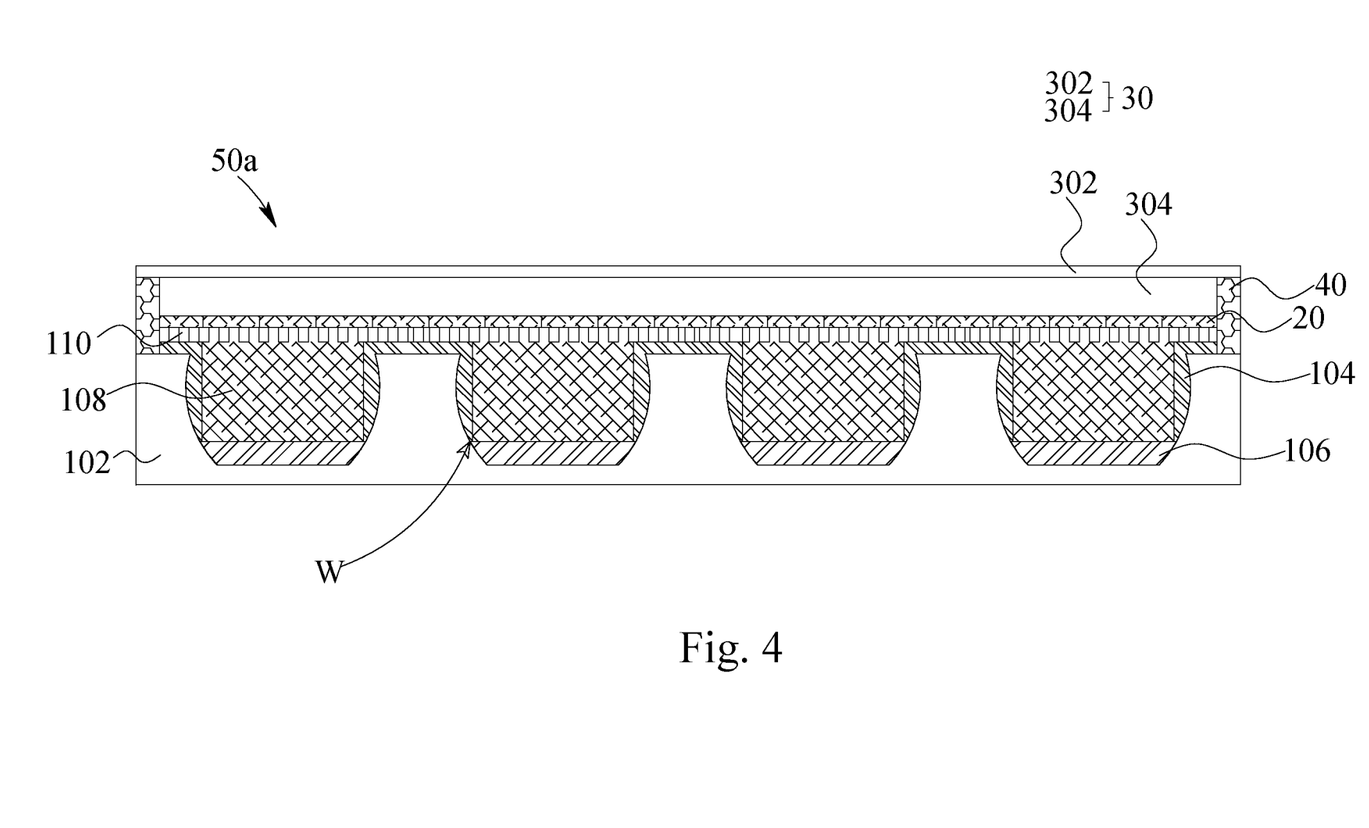
FIG. 4 illustrates a cross-section diagram of the lithium metal battery of the present invention.

In FIG. 4, a lithium metal battery is illustrated. The lithium metal battery 50a comprises a lithium metal electrode 10, a cathode electrode 30, an electrical insulator 20 and a sealing frame 40. The cathode electrode 30, comprising a second current collector 302 and a cathode active material layer 304, is disposed corresponding to the lithium metal electrode 10. The electrical insulator 20 is disposed between the cathode electrode 30 and the lithium metal electrode 10. The sealing frame 40 disposed on an inner periphery alone both of the first current collector 102 of the lithium metal electrode 10 and the second current collector 302 of the cathode electrode 30 for sealing. Most of the sealing frame 40 is disposed orthogonally within a periphery of the lithium metal electrode 10 and/or the cathode electrode 30. That is, most of the sealing frame 40 is disposed on the inner surface of the lithium metal electrode 102 and on the inner surface of the cathode electrode 302 instead of extrudes to the outer periphery of both of the first current collector 102 of the lithium metal electrode 10b and the second current collector 302 of the cathode electrode 30.

Of course, the abovementioned is mainly about the most of the sealing frame 40, that is, in certain case, such as the case that the first current collector 102 and the second current collector 302 do not have the same area, some parts of the sealing frame 40 extrudes toward the outer periphery of both of the first current collector 102 of the lithium metal electrode 10 and the second current collector 302 of the cathode electrode 30.

Figure 5:
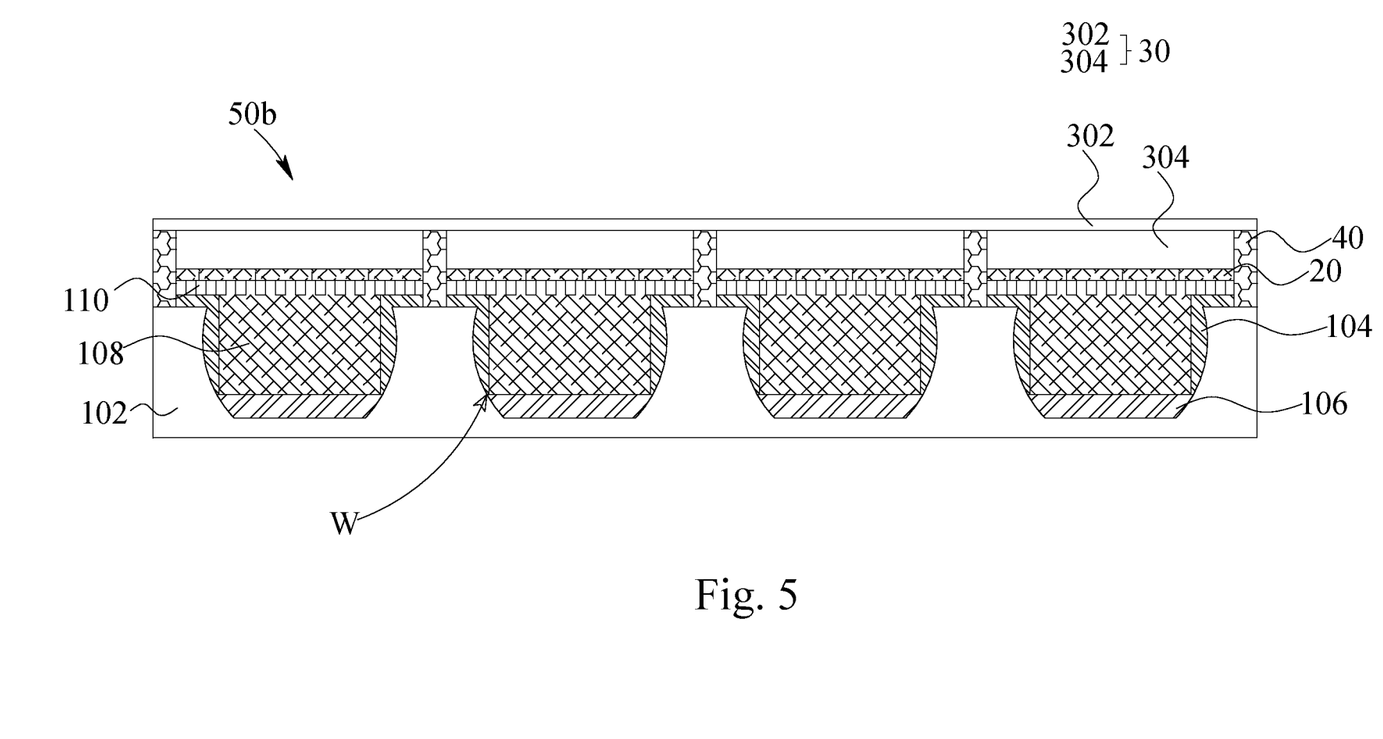
FIG. 5 illustrates a cross-section diagram of the lithium metal battery of the present invention.

In FIG. 5, a lithium metal battery is illustrated. The lithium metal battery 50b comprises a lithium metal electrode 10, a cathode electrode 30, an electrical insulator 20 and a sealing frame 40. The cathode electrode 30, comprising a second current collector 302 and a cathode active material layer 304, is disposed corresponding to the lithium metal electrode 10. The electrical insulator 20 is disposed between the cathode electrode 30 and the lithium metal electrode 10. The sealing frame 40 is disposed corresponding to the insulation frame 104, and the sealing frame 40 adheres to the insulation frame 104 for sealing the lithium metal battery 50*b*. More precisely, each well W has been sealed via the sealing frame 40. Occasionally, the sealing frame 40 adheres to the insulation frame 104 further via a third adhesion layer (not shown).

The electrical insulator 20 mentioned above is ionic conductive and can be a polymer separator, a polymer separator having coatings, a ceramic separator or a solid electrolyte. As the electrolyte system of the lithium metal battery 50*a* and 50*b* has a liquid-phase electrolyte, gel-phase electrolyte or a hybrid-phase electrolyte, the electrical insulator 20 can be selected from the polymer separator, the polymer separator having coatings and/or the ceramic separator. As the electrolyte of the lithium metal battery 50*a* and 50*b* is solid-phase electrolyte, the electrical insulator 20 can be the solid electrolyte.

The mechanism of the present invention will be disclosed hereinafter. The porous electrical insulation layer is disposed on the current collector. The lithium metal layer is disposed on the bottom surface of the well of the current collector. The ionic diffusion layer is disposed inside the well. Accordingly, the lithium ions from the electrolyte will migrate through the through hole of the porous electrical insulation layer and approach to the ionic diffusion layer, moistened or stained with the liquid electrolyte and/or the gel electrolyte, inside the well of the current collector. The lithium ions can be transferred through the pores formed via the particles and/or fibers of the ionic diffusion layer. In some cases, the lithium ions would plate as a dendrite or form a SEI on the outer surface of the ionic diffusion layer. The lithium dendrite plates and strips inside the pores of the ionic diffusion layer. During plating, the lithium dendrite attaches to the particles and/or the fibers of the ionic diffusion layer to enhance the strength of the solid electrolyte interface (SEI), especially the ionic diffusion layer having a charged surface. That is, the surface tension of the SEI is released via attaching well to the ionic diffusion layer so that the SEI become much more stable. Comparing to the SEI's thickness (around 10~50 nanometers), the volume change (15~20 microns) of plating/stripping of the lithium dendrite is too violent and the SEI will be seriously damaged during plating and/or stripping of the lithium dendrite without providing the supporting from the ionic diffusion layer. The ionic diffusion layer having particles and/or the fibers can provide supporting for the SEI to decrease the capacity loss of the battery and even, under certain conditions, can react with the reaction of forming the SEI.

The wells of the current collector and the porous electrical insulation layer efficiently inhibits the height of plating of the lithium dendrite during charging due to the structural strength of the porous electrical insulation layer. The lithium dendrite will mainly plate horizontally so that the specific regions inside the wells are highly and efficiently used for lithium dendrite plating. Hence, the lithium dendrite will not penetrate through the electrical insulator to avoid inner shorting of the battery. Meanwhile, the lithium dendrite plate toward the radiation direction instead of toward the vertical direction so that the thickness of the battery will not verify extremely.

The surfaces and/or the pores created via the particles and/or fibers of the ionic diffusion layer can serve as the diversions for the liquid and/or gel electrolyte so that the plating/stripping of the lithium dendrite can be more efficient for continuous interface of the electrolyte. Also, the interface between the lithium dendrite and the electrolyte can be kept complete so that the resistance of the interface can be reduced and the uniformity of the lithium dendrite plating can be revealed via controlling the over-voltage of the interface.

The two embodiments of lithium metal battery illustrated above are mainly differ due to the package modules. One, as illustrated in FIG. 4, is to seal the periphery of the entire battery; another, as illustrated in FIG. 5, is to seal each well individually. The electrical and safety performances of both of the batteries 50*a* and 50*b* are kept good even been packed in different ways. The most distinguished character between these two embodiments is that the one sealed alone the periphery has better ability of bending. The one sealed for each well individually is more rigid and has poor flexibility.

Consequently, the insulation layer and the inhibition layer both have enough structural strength to inhibit the forming direction of the lithium dendrite so that Young's modulus of insulation layer and the inhibition layer have to be high enough. Besides, lithium metal battery become more flexible as the battery is sealed only alone its periphery. In contrast, the lithium metal battery become more rigid as the battery is sealed via each well individually.

Comparing to the prior art, the lithium metal electrode and its related lithium metal battery disclosed in the present invention can improve the safety of the battery via the electrical insulated porous electrical insulation layer to inhibit the forming directions and regions of the lithium dendrite.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium metal electrode, comprising:
   a current collector, having at least a well having an inner sidewall and a bottom surface;
   at least a lithium metal layer, disposed on the bottom surface of the well and covering some parts of the inner sidewall of the well, and the lithium metal layer has a thickness;
   at least an insulation frame, disposed along a periphery of an opening of the well, and the insulation frame extends radially outward from the opening to cover a top surface of the current collector partially and extends vertically toward the inner sidewall of the well, and the insulation frame contacts a top surface of the lithium metal layer so that at least a portion of the inner sidewall of the well is completely covered for electrically insulation;
   a porous electrical insulation layer, covering the opening of the well and having a plurality of through holes, and a diameter of a through hole is smaller than a diameter of the well; and
   at least an ionic diffusion layer, disposed inside the well and under the porous electrical insulation layer and the through holes completely, and the ionic diffusion layer is porous.

2. The lithium metal electrode according to claim 1, wherein a thickness of the current collector ranges from 16 to 50 microns.

3. The lithium metal electrode according to claim 1, wherein a depth of the well ranges from 15 to 40 microns.

4. The lithium metal electrode according to claim 1, wherein a thickness of the current collector ranges from 1 to 10 microns.

5. The lithium metal electrode according to claim 1, wherein the insulation frame is a single-layer structure.

6. The lithium metal electrode according to claim 5, wherein a material of the insulation frame is an electrical insulation material, any material having an electrical insulation coating or any material completely covered with an electrical insulation material.

7. The lithium metal electrode according to claim 1, wherein the porous electrical insulation layer is a single-layer structure.

8. The lithium metal electrode according to claim 7, wherein a material of the porous electrical insulation layer is made of an electrical insulation material, any material having an electrical insulation coating or any material completely covered via electrical insulation material.

9. The lithium metal electrode according to claim 1, wherein an aperture ratio of the porous electrical insulation layer ranges from 25 to 80%.

10. The lithium metal electrode according to claim 1, wherein diameters of the through holes are uniformed.

11. The lithium metal electrode according to claim 10, wherein diameters of the through holes are not larger than 1 micron.

12. The lithium metal electrode according to claim 1, wherein a thickness of the porous electrical insulation layer ranges from 1 to 25 microns.

13. The lithium metal electrode according to claim 1, wherein the porous electrical insulation layer further extends radially outward from the insulation frame and at least partially covers the insulation frame.

14. The lithium metal electrode according to claim 1, wherein the current collector adheres to the insulation frame further via a first adhesion layer.

15. The lithium metal electrode according to claim 14, wherein a thickness of the first adhesion layer ranges from 1 to 30 microns.

16. The lithium metal electrode according to claim 1, wherein the insulation frame adheres to the porous electrical insulation layer further via a second adhesion layer.

17. The lithium metal electrode according to claim 16, wherein a thickness of the second adhesion layer ranges from 1 to 30 microns.

18. The lithium metal electrode according to claim 1, wherein a material of the ionic diffusion layer is selected from the group consisting of polymer material, ceramic material, glass material, fiber material and any combinations thereof.

19. The lithium metal electrode according to claim 1, wherein the ionic diffusion layer is further treated to have a charged surface, and the charged surface carries anions and/or cations.

20. The lithium metal electrode according to claim 1, wherein a thickness of the lithium metal layer ranges from 0.3 to 5 microns.

21. A lithium metal battery, comprising:
  a lithium metal electrode, comprising:
    a first current collector, having at least a well having an inner sidewall and a bottom surface;
    at least a lithium metal layer, disposed on the bottom surface of the well and covering some parts of the inner sidewall of the well, and the lithium metal layer has a thickness;
    at least an insulation frame, disposed along a periphery of an opening of the well, and the insulation frame extends radially outward from the opening to cover a top surface of the first current collector partially and extends vertically toward the inner sidewall of the well, and the insulation frame contacts a top surface of the lithium metal layer so that at least a portion of the inner sidewall of the well is completely covered for electrically insulation;
    a porous electrical insulation layer, covering the opening of the well and having a plurality of through holes, and a diameter of a through hole is smaller than a diameter of the well; and
    at least an ionic diffusion layer, disposed inside the well and under the porous electrical insulation layer and the through holes completely, and the ionic diffusion layer is porous;
  a cathode electrode, disposed corresponding to the lithium metal electrode and having a second current collector and a cathode active material layer;
  an electrical insulator, disposed between the cathode electrode and the lithium metal electrode and having at least an electrolyte; and
  a sealing frame, disposed on an inner periphery along both of the first current collector of the lithium metal electrode and the second current collector of the cathode electrode for sealing.

22. The lithium metal battery according to claim 21, wherein the electrical insulator is ionic conductive, and the electrical insulator is a polymer separator, a polymer separator having coatings, a ceramic separator or a solid electrolyte.

23. The lithium metal battery according to claim 21, wherein at least a portion of the sealing frame is disposed orthogonally within a periphery of at least one of the lithium metal electrode and the cathode electrode.

24. A lithium metal battery, comprising:
  a lithium metal electrode, comprising:
    a first current collector, having at least a well having an inner sidewall and a bottom surface;
    at least a lithium metal layer, disposed on the bottom surface of the well and covering some parts of the inner sidewall of the well, and the lithium metal layer has a thickness;
    at least an insulation frame, disposed along a periphery of an opening of the well, and the insulation frame extends radially outward from the opening to cover a top surface of the first current collector partially and extends vertically toward the inner sidewall of the well, and the insulation frame contacts a top surface of the lithium metal layer so that at least a portion of the inner sidewall of the well is completely covered for electrically insulation;
    a porous electrical insulation layer, covering the opening of the well and having a plurality of through holes, and a diameter of a through hole is smaller than diameter of the well; and
    at least an ionic diffusion layer, disposed inside the well and under the porous electrical insulation layer and the through holes completely, and the ionic diffusion layer is porous;
  a cathode electrode, disposed corresponding to the lithium metal electrode and having a second current collector and a cathode active material layer;
  an electrical insulator, disposed between the cathode electrode and the lithium metal electrode and having at least an electrolyte; and a sealing frame, disposed corresponding to the insulation frame, the sealing frame adheres to the insulation frame for sealing.

25. The lithium metal battery according to claim 24, wherein the electrical insulator is ionic conductive, and the electrical insulator is a polymer separator, a polymer separator having coatings, a ceramic separator or a solid electrolyte.

26. The lithium metal battery according to claim 24, wherein at least a portion of the sealing frame adheres to the insulation frame further via a third adhesion layer.

27. The lithium metal electrode according to claim 1, wherein the insulation frame is a multi-layer structure.

28. The lithium metal electrode according to claim 1, wherein the porous electrical insulation layer is a multi-layer structure.

29. The lithium metal electrode according to claim 1, wherein diameters of the through holes are not uniform.

* * * * *